(12) United States Patent
Song et al.

(10) Patent No.: US 11,803,337 B2
(45) Date of Patent: *Oct. 31, 2023

(54) NDP-SERVER: A DATA-CENTRIC COMPUTING ARCHITECTURE BASED ON STORAGE SERVER IN DATA CENTER

(71) Applicant: Samsung Electronics Co., Ltd., Suwon-si (KR)

(72) Inventors: Xiaojia Song, San Jose, CA (US); Stephen Garry Fischer, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/121,753

(22) Filed: Dec. 14, 2020

(65) Prior Publication Data

US 2021/0096747 A1  Apr. 1, 2021

Related U.S. Application Data

(63) Continuation of application No. 16/028,281, filed on Jul. 5, 2018, now Pat. No. 10,884,672.

(60) Provisional application No. 62/651,707, filed on Apr. 2, 2018.

(51) Int. Cl.
*G06F 12/00* (2006.01)
*G06F 3/06* (2006.01)
*G06F 13/16* (2006.01)

(52) U.S. Cl.
CPC ............ *G06F 3/067* (2013.01); *G06F 3/0604* (2013.01); *G06F 3/0611* (2013.01);
(Continued)

(58) Field of Classification Search
CPC ........ G06F 3/067; G06F 3/0679; G06F 13/16; G06F 3/0604; G06F 3/0611;
(Continued)

(56) References Cited

U.S. PATENT DOCUMENTS 7,716,440 B2 ‡  5/2010  Taninaka .............. G06F 3/0607
707/823
8,356,205 B2    1/2013  Fukuyama
(Continued)

FOREIGN PATENT DOCUMENTS

CN  103336745 A  10/2013
CN  104125292 A  10/2014
(Continued)

OTHER PUBLICATIONS

Yoshimi, Masato et al., "Accelerating OLAP workload on interconnected FPGAs with Flash storage", Conference Publishing Services, 2014 Second International Symposium on Computing and Networking, Dec. 10, 2014.‡

(Continued)

*Primary Examiner* — Mardochee Chery
(74) *Attorney, Agent, or Firm* — Renaissance IP Law Group LLP

(57) ABSTRACT

A server system includes a first plurality of mass-storage devices, a central processing unit (CPU), and at least one near data processing (NDP) engine. The CPU is coupled to the first plurality of the mass-storage devices, such as solid-state drive (SSD) devices, and the at least one NDP engine is associated with a second plurality of the mass-storage devices and interposed between the CPU and the second plurality of the mass-storage devices associated with the NDP engine. The second plurality of the mass-storage devices is less than or equal to the first plurality of the mass-storage devices. A number of NDP engines may be based on a minimum bandwidth of a bandwidth associated with the CPU, a bandwidth associated with a network, a bandwidth associated with the communication fabric and a bandwidth associated with all NDP engines divided by a bandwidth associated with a single NDP engine.

20 Claims, 15 Drawing Sheets

(52) U.S. Cl.
CPC ............ *G06F 3/0679* (2013.01); *G06F 13/16* (2013.01); *G06F 2212/1024* (2013.01); *G06F 2213/0026* (2013.01)

(58) Field of Classification Search
CPC ..... G06F 2212/1024; G06F 2213/0026; G06F 3/0658; G06F 3/0688; G06F 3/0613; G06F 13/4022; H04L 12/02
USPC ........................................................ 711/114
See application file for complete search history.

(56) References Cited

U.S. PATENT DOCUMENTS

| | | | |
|---|---|---|---|
| 9,965,356 | B2 | 5/2018 | Li |
| 10,447,534 | B1 * | 10/2019 | Savic ...................... H04L 43/08 |
| 2012/0030059 | A1 | 2/2012 | McCormick et al. |
| 2016/0094619 | A1 | 3/2016 | Khan et al. |
| 2016/0378401 | A1 | 12/2016 | Savic et al. |
| 2017/0177269 | A1 | 6/2017 | Beard |
| 2017/0192718 | A1 | 7/2017 | Tsujimoto et al. |
| 2017/0285968 | A1 ‡ | 10/2017 | Jung ..................... G06F 3/0604 |
| 2018/0024743 | A1 * | 1/2018 | Herman ................ G06F 3/0659 710/316 |
| 2019/0004992 | A1 ‡ | 1/2019 | Li ....................... G06F 12/0831 |

FOREIGN PATENT DOCUMENTS

| | | | |
|---|---|---|---|
| CN | 105573959 | A | 5/2016 |
| CN | 106933510 | A ‡ | 7/2017 |
| CN | 106933510 | A | 7/2017 |
| CN | 107341130 | A | 11/2017 |
| CN | 107799151 | A | 3/2018 |
| JP | 2010231598 | A | 10/2010 |
| JP | 2017534942 | A | 11/2017 |

OTHER PUBLICATIONS

Handley, Mark et al., "Re-architecting datacenter networks and stacks for low latency and high performance", SIGCOMM ' 17, Aug. 21-25, 2017, Los Angeles, CA, USA.‡
Final Office Action for U.S. Appl. No. 16/028,281, dated Apr. 15, 2020.
Notice of Allowance for U.S. Appl. No. 16/028,281, dated Sep. 2, 2020.
Office Action for U.S. Appl. No. 16/028,281, dated Oct. 8, 2019.
Wang, Chao, et al., "Reconfigurable Hardware Accelerators: Opportunities, Trends, and Challenges," Computer Science, Hardware Architecture, arXiv preprint arXiv:1712.04771, Dec. 13, 2017, 25 pages.

\* cited by examiner
‡ imported from a related application

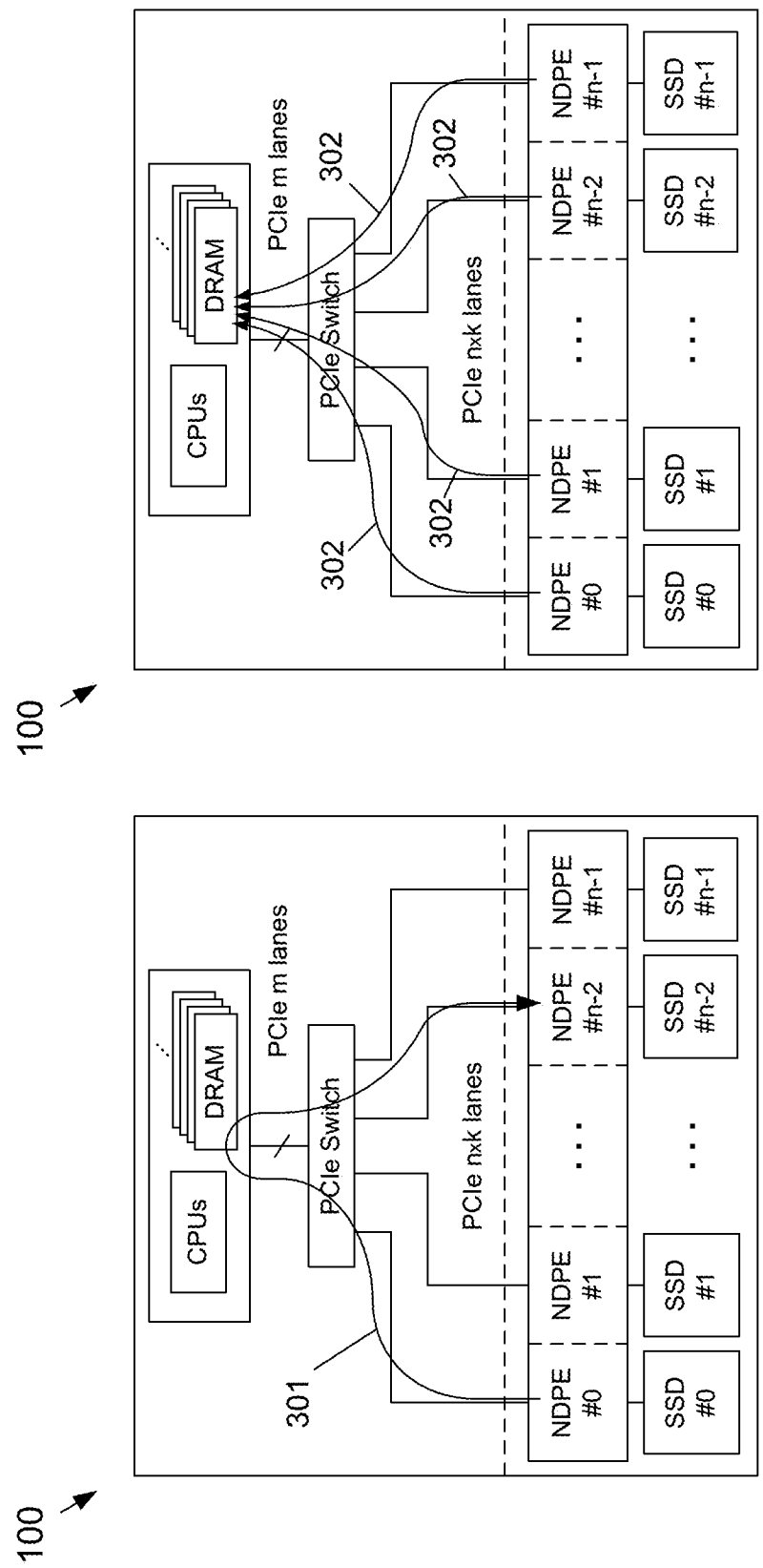

NDP-SERVER: A DATA-CENTRIC COMPUTING ARCHITECTURE BASED ON STORAGE SERVER IN DATA CENTER

CROSS-REFERENCE TO RELATED APPLICATION

This application is a continuation of U.S. patent application Ser. No. 16/028,281, filed Jul. 5, 2018, which claims the priority benefit under 35 U.S.C. § 119(e) of U.S. Provisional Patent Application No. 62/651,707, filed on Apr. 2, 2018, the disclosure of which is incorporated herein by reference in its entirety.

TECHNICAL FIELD

The subject matter disclosed herein generally relates to a system and a method to reduce performance imbalances in a server system and, more particularly, a server system architecture and a method to provide data processing near where data may be stored to reduce performance imbalances in a server system.

BACKGROUND

Modern data centers may suffer an imbalance between data processing and data movement that may degrade both performance and energy efficiency of a data center. The imbalance is usually based on a latency, or bottleneck, associated with components of the server system. For example, a data-intensive application may result in a performance bottleneck caused by data movement through the memory. For a computation-intensive application, a bottleneck may be caused by the load on the processors. The imbalance may also incur extra energy consumption, which is mainly based on the underutilization of components of the server system, e.g., the memory and/or processors that may be in an idle status waiting for data or an instruction, but still consume energy to maintain a current status.

The trend of employing big-data analytics may further aggravate the imbalances that may occur in a server system. For example, big data analytics may operate on large and varied data sets to uncover hidden patterns, unknown correlations, market trends, customer preferences and/or other useful information. For such big-data analytics, massive data movement may be involved, which may be prone to causing a performance bottleneck. Similarly, machine learning, which provides powerful tools for big-data analytics, are significantly compute-intensive while also involving large sets of data for training. If the volume of the data being processed and the analytic complexity of data-processing of a workload scale upwards, both performance and energy efficiency of a data center may further degrade.

SUMMARY

An example embodiment provides a server system that may include a first plurality of mass-storage devices, at least one central processing unit (CPU) and at least one near data processing (NDP) engine. The at least CPU may be coupled to the first plurality of the mass-storage devices. Each NDP engine may be associated with a second plurality of the mass-storage devices and interposed between the CPU and the second plurality of the mass-storage devices associated with the NDP engine. A quantity of the second plurality of the mass-storage devices may be less than or equal to a quantity of the first plurality of the mass-storage devices. The mass-storage devices may include at least one solid-state drive (SSD) device. A network interface may communicatively couple the server system to at least one remote system through a network in which the at least one remote system may be external to the server system, and a communication fabric may be interposed between the CPU and the at least one NDP engine. In one embodiment, a number of NDP engines forming the server system may be based, at least in part, on a minimum bandwidth of a bandwidth associated with the CPU, a bandwidth associated with the network, a bandwidth associated with the communication fabric and a bandwidth associated with all NDP engines divided by a bandwidth associated with a single NDP engine. In another embodiment, a switch layer may be interposed between an NDP engine and the first plurality of mass-storage devices in which the switch layer may be communicatively coupling the NDP engine with the second plurality of the mass-storage devices associated with the NDP engine. In still another embodiment, the switch layer may be interposed between a second NDP engine and the first plurality of mass-storage devices in which the switch layer may be communicatively coupling the second NDP engine with the second plurality of mass-storage devices associated with the second NDP engine.

Another example embodiment provides a server system that may include a network interface, a first plurality of SSD devices, at least one CPU and at least one NDP engine. The network interface may communicatively couple the server system to at least one remote system through a network in which the at least one remote system may be external to the server system. The at least one CPU may be coupled to the network interface and the first plurality of SSD devices. Each NDP engine may be associated with a second plurality of the SSD devices and interposed between the CPU and the second plurality of the SSD devices associated with the NDP engine in which a quantity of the second plurality of the SSD devices may be less than or equal to a quantity of the first plurality of the SSD devices. A communication fabric may be interposed between the CPU and the at least one NDP engine, and a number of NDP engines forming the server system may be based on a minimum bandwidth of a bandwidth associated with the CPU, a bandwidth associated with the network, a bandwidth associated with the communication fabric and a bandwidth associated with all NDP engines divided by a bandwidth associated with a single NDP engine.

Still another example embodiment provides a server system that may include a first plurality of mass-storage devices, at least one CPU, at least one NDP engine, and a switch layer. The at least one CPU may be coupled to the first plurality of the mass-storage devices. Each NDP engine may be associated with a second plurality of the mass-storage devices and interposed between the CPU and the second plurality of the mass-storage devices associated with the NDP engine. A quantity of the second plurality of the mass-storage devices may be less than or equal to a quantity of the first plurality of the mass-storage devices. The switch layer may be interposed between each NDP engine and the first plurality of mass-storage devices in which the switch layer may be communicatively coupling each NDP engine with the respective second plurality of the mass-storage devices associated with the NDP engine. A network interface may be communicatively couples the server system to at least one remote system through a network in which the at least one remote system may be external to the server system, and a communication fabric may be interposed between the CPU and the at least one NDP engine. The switch layer may be interposed between a second NDP engine and the first plurality of mass-storage devices in which the switch layer may communicatively couple the second NDP engine with the second plurality of mass-storage devices associated with the second NDP engine.

BRIEF DESCRIPTION OF THE DRAWINGS

In the following section, the aspects of the subject matter disclosed herein will be described with reference to exemplary embodiments illustrated in the figures, in which:

FIGS. 3A and 3B respectively depict example paths that data may follow through a server system having NDP according to the subject matter disclosed herein;

DETAILED DESCRIPTION

Figure 1A:
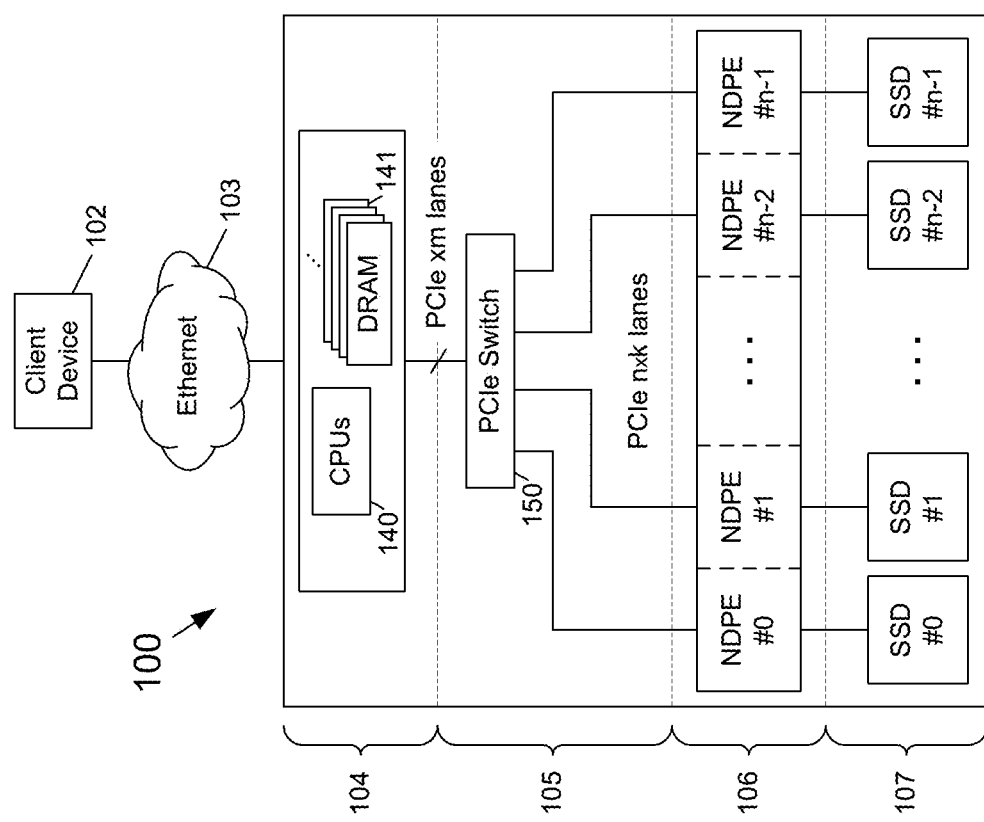
FIG. 1A depicts a block diagram of a first example embodiment of an architecture of a server system according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Near-data processing (NDP) may be used for optimizing the architecture of a data center server to reduce imbalance issues that may be caused by data processing and data movement. An NDP-Server architecture may be used that incorporates embedded processors (e.g., CPU, ARM, RISC V, etc.) and/or field programmable gate arrays (FPGAs) as alternative types of NDP engines to respectively form a PNDP-Server (Processor-based NDP Server architecture or an FNDP-Server (FPGA-based NDP Server) architecture. For example, an FNDP-Server architecture that uses FPGAs as an NDP engine provides significant benefits, not only in performance improvement and energy efficiency, but also in system cost.

NDP may minimize data movement by processing the data at the most appropriate location in a server system architecture based on the location of the data and the information that is to be extracted from that data. Thus, in NDP, computation may be performed right where the data is located, such as in caches, main memory, and/or persistent storage. This is in contrast to moving data toward a CPU independent from where the data may be stored. NDP processing may generally be divided into three groups based on the different positions that NDP engines may be located in a memory hierarchy, i.e., (i) NDP in storage devices (e.g., SSD, HDD); (ii) NDP near storage devices (usually interposed between the SSD, HDD and host); (iii) NDP in dynamic random access memory (DRAM) (adjacent to the processors).

In one embodiment, one or more NDP engines may be interposed between the processors and the mass storage (such as solid-state drive (SSD) devices) of a server system. The NDP engines may be configured to minimize data movement by providing computing and/or data processing at a more appropriate location within the server system than at the processors of the server system. In another embodiment, the one or more NDP engines may be configured to not only minimize data movement, but also to reduce the load on the processors that may be caused by compute-intensive applications. In one embodiment, pairing an NDP engine with one or more SSDs may provide a scalable system configuration.

In one embodiment, the subject matter disclosed herein provides NDP interposed on the path between SSDs and host CPU(s) (i.e., NDP near SSD, HDD). In another embodiment, NDP may be located within an SSD of a storage server with the aim of reducing the data movement and more fully using parallelism between the SSDs. In still another embodiment, one or more NDP engines may be integrated into DRAM.

All types of computing units (e.g., high energy-efficient embedded processors, FPGAs, streaming processors, etc.) may be used as NDP engines. For example, in one embodiment, a controller in an SSD device may process data that has been accessed from the physical storage medium of the SSD device. That is, an NDP engine may be placed in the path between a host and an SSD device for a data-processing application. In another embodiment, one or more NDP engines may be integrated into DRAM.

FIG. 1A depicts a block diagram of a first example embodiment of an architecture of a server system 100 according to the subject matter disclosed herein. The server system 100 may be connected to one or more client devices 102, of which only one client device is depicted, through one or more communication networks 103, of which only one communication network is depicted.

The server system 100 may include a processor layer 104, a communication fabric layer 105, an NDP engine (NDPE) layer 106 and a storage layer 107. The mass-storage layer 107 may be connected to the communication fabric layer 105 through the NDPE layer 106, and the communication fabric layer 105 may connect the NDPE layer 106 and the storage layer 107 to the processor layer 104. The full data-transfer bandwidth of the SSDs may be delivered to the system with the NDPE layer 106 being connected between the communication fabric layer 105 and the SSD layer 107, while also reducing any imbalances that may be caused by data-intensive or compute-intensive applications.

The processor layer 104 may include one or more processors 140 and a system memory 141. In one embodiment, the system memory 141 may include DRAM. In another embodiment, the system memory 141 may include volatile memory of any type and/or non-volatile memory of any type. The communication fabric layer 105 may include one or more communication switches 150 and communication links. In one example embodiment, the communication fabric layer 105 may be a Peripheral Component Interconnect Express (PCIe) based communication fabric, although the communication fabric layer 105 is not so limited.

The NDPE layer 106 may include one or more NDP engines. The NDPE layer 106 includes n NDP engines NDPE #0-NDPE #n−1, in which n is an integer. The NDP engines of the NDPE layer 106 may be processor-based NDP engines, FPGA-based NDP engines, or a combination thereof. Other types of NDP engines are also possible and may be used. The storage layer 107 may include one or more mass-storage devices. In one embodiment, the one or more mass-storage devices may include SSD devices. In another embodiment, the one or more mass-storage devices may include HDD devices. The mass-storage layer 107 may include n SSD #0-SSD #n−1. For the example embodiment depicted in FIG. 1A, each NDP engine corresponds to a respective SSD device.

Figure 1B:
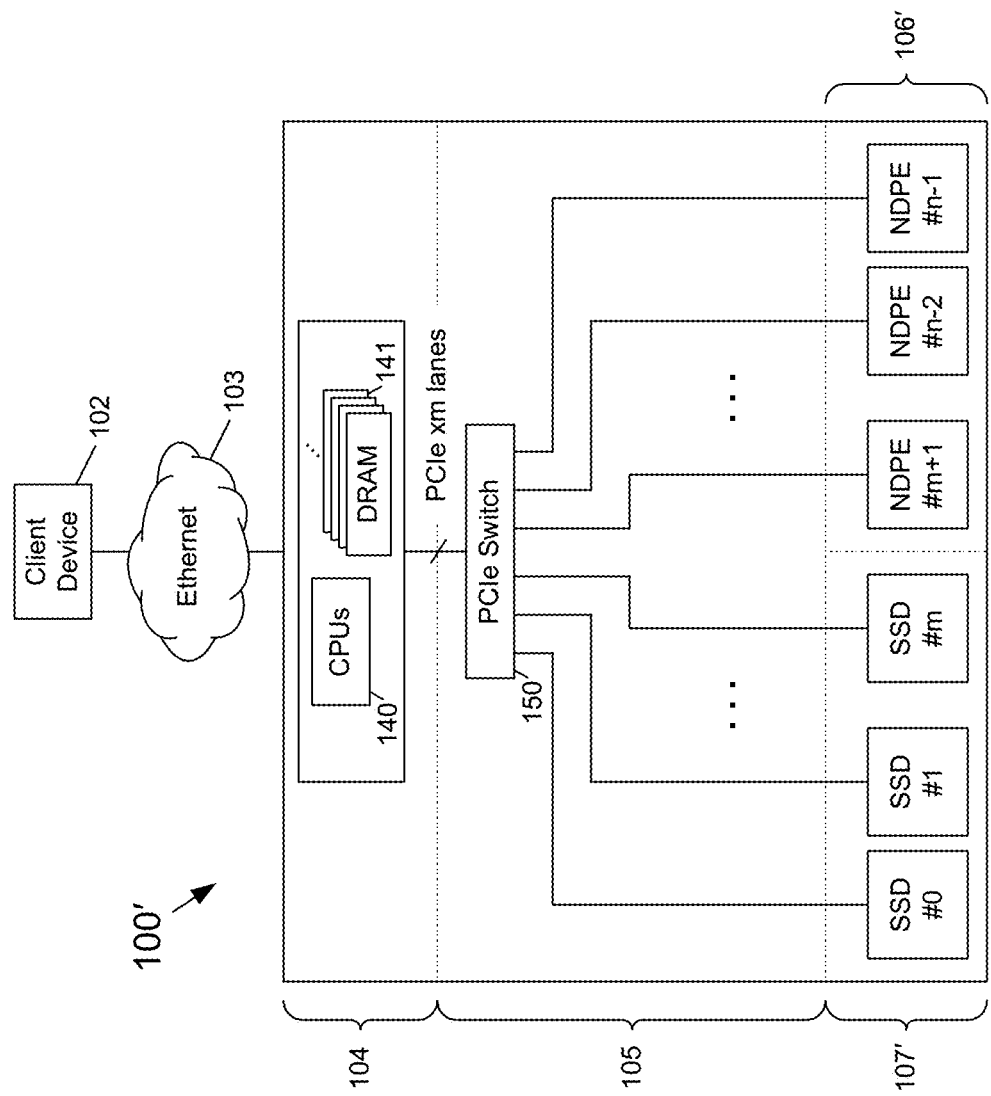
FIG. 1B depicts a block diagram of a second example embodiment of an architecture of a server system according to the subject matter disclosed herein.

FIG. 1B depicts a block diagram of a second example embodiment of an architecture of a server system 100' according to the subject matter disclosed herein. The server system 100' may be connected to one or more client devices 102, of which only one client device is depicted, through one or more communication networks 103, of which only one communication network is depicted.

The server system 100' may include a processor layer 104, a communication fabric layer 105, an NDPE layer 106' and a storage layer 107'. The mass-storage layer 107' may be connected to the NDPE layer 106' through the communication fabric layer 105, and the communication fabric layer 105 may connect the NDPE layer 106' and the storage layer 107' to the processor layer 104.

Similar to the server system 100 depicted in FIG. 1A, the processor layer 104 of the server system 100' may include one or more processors 140 and a system memory 141. In one embodiment, the system memory 141 may include DRAM. In another embodiment, the system memory 141 may include volatile memory of any type and/or non-volatile memory of any type. The communication fabric layer 105 may include one or more communication switches 150 and communication links. In one example embodiment, the communication fabric layer 105 may be a PCIe based communication fabric, although the communication fabric layer 105 is not so limited.

The NDPE layer 106' may include one or more NDP engines. The NDPE layer 106' includes n−m NDP engines NDPE #m+1-NDPE #n−1 in which n and m are integers and m<n. The NDP engines of the NDPE layer 106' may be a processor-based NDP engine, an FPGA-based NDP engine, or a combination thereof. Other types of NDP engines are also possible and may be used. The storage layer 107 may include one or more mass-storage devices. In one embodiment, the one or more mass-storage devices may include SSD devices. In another embodiment, the one or more mass-storage device may include HDD devices. The mass-storage layer 107 may include m SSD #0-SSD #m.

Figure 2:
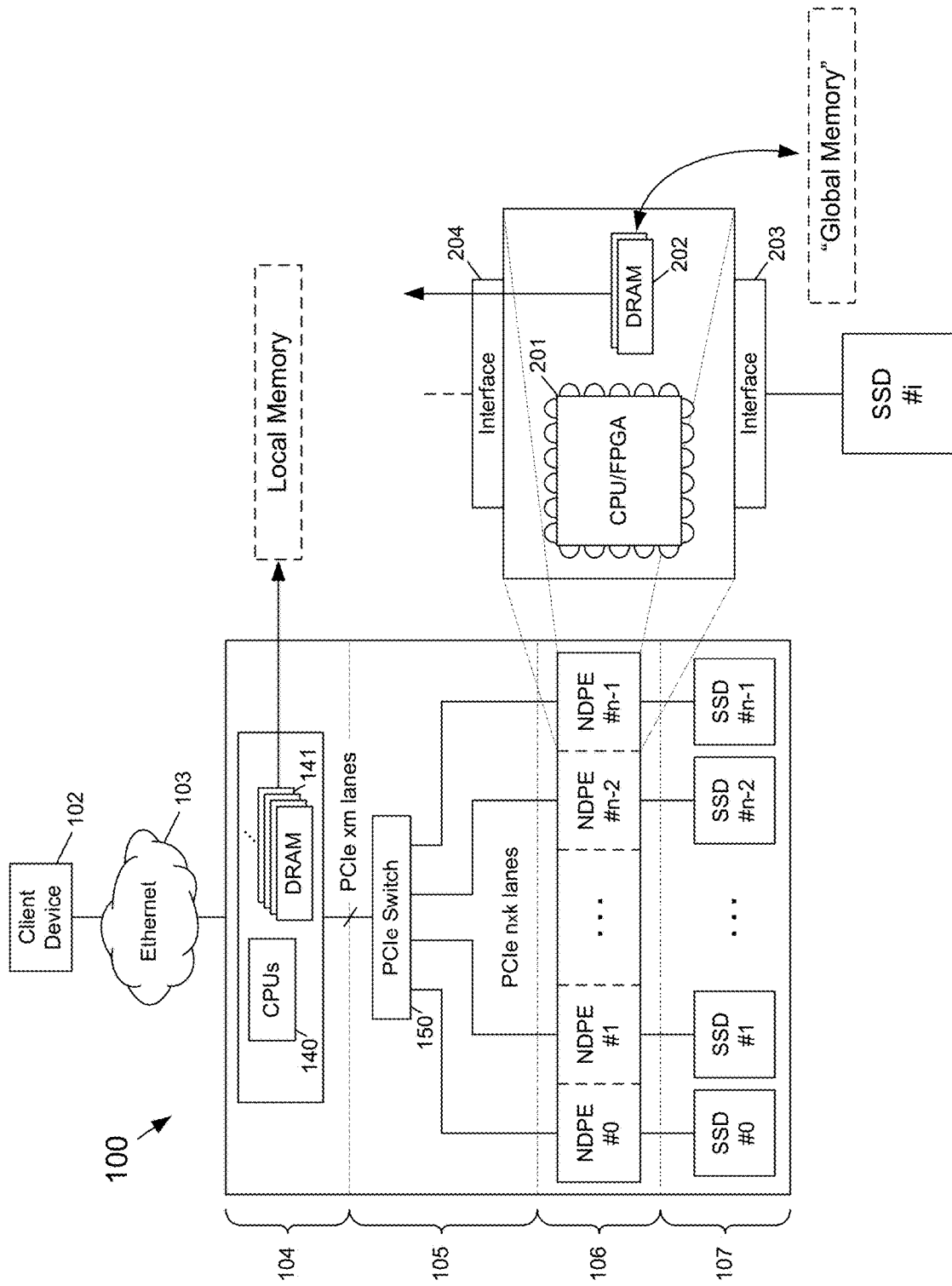
FIG. 2 depicts the architecture of a server system and a block diagram of an NDP engine according to the subject matter disclosed herein.

FIG. 2 depicts the architecture of a server system 100 and a block diagram of an NDP engine according to the subject matter disclosed herein. An NDP engine may include a data-processing device 201, memory 202 and interfaces 203 and 204. The interfaces 203 and 204 may respectively connect to one or more SSDs (represented by a single SSD #i) in the storage layer 107 and to the communication fabric 105. In one embodiment, the data-processing device 201 may be a processor-embedded core, such as, but not limited to, a quad-core ARM Cortex-A53 device. In another embodiment, the data-processing device 201 may be an FPGA device, in which case the SSDs connected to the FPGA-based NDPE may partition hardware resources (i.e., DSP slices, LUT, RAM, etc.) in the FPGA chip. The system 100 may leverage the partitioned resources to instantiate a kernel for each respective SSD that may be connected to the NDPE. Although a processor-based NDPE and an FPGA-based NDPE may have different application implementations, there will be a processing element (for example, a quad-core ARM Cortex-A53, or an application kernel instantiated by FPGA resources) for processing the data for each SSD separately.

The memory 202 in the NDP engine may be DRAM and may be used for a metadata store. The DRAM may also provide a buffer for data movement between an SSD and the NDP engine, between the NDP engine and a host CPU, and/or as an intermediate data store during an application executed by the NDP engine. The interfaces 203 and 204 may provide connections from NDPE to the SSD and to host CPUs. In one embodiment, the interfaces 203 and 204 may be PCIe based interfaces.

The architecture of the server system 100 depicted in FIG. 2 may include two types of processing units, i.e., one or more host CPUs and one or more NDP engines. All of the NDP engines in the server system may not automatically provide near data processing, i.e., reading data from the SSD and executing the data processing in the NDP engine. The data processing may start at the host CPUs. The host CPUs may be configured to be responsible for: (i) managing the operating system of the server; (ii) monitoring the status of all NDP engines in the server system; (iii) executing one or more host-side application programs; (iv) offloading an NDPE-side application program to NDPE layer; and (v) writing the arguments to the NDPE-side application program and launching the NDPE layer to read and process the data from corresponding SSDs.

Also as depicted in FIG. 2, there may be two types of DRAM in the system, i.e., host DRAM and NDPE DRAM. The NDPE DRAM may be considered to be a type of "global" memory in which the NDPE DRAM may be accessible by the host CPUs and the processing device in the NDPE for NDPE-side application parameters that pass from the host CPUs and the data buffer. It should be understood that as used herein, the term "global memory" is not global memory for the overall server system depicted in FIG. 2 because the "global memory" in a particular NDP engine may not be directly accessible by the other NDP engines.

The NDP engines in the server system 100 depicted in FIG. 2 may not be directly connected to each other in order to simplify the server system 100. As depicted in FIG. 2, the host DRAM may be used as part of a data transfer path between different NDP engines, so if there is a communication/data transfer between the two NDP engines, the data may be routed to the corresponding NDP engine through the host DRAM. For example, if the NDPE #n–2 in FIG. 3A is to receive data from the NDPE #0, the data would follow path 301 from the NDPE #0 through the host DRAM to the NDPE #n–2. As another example, if the data processing is done in each NDPE, the result data may be aggregated in the host DRAM for further processing in CPU, as depicted by paths 302 in FIG. 3B. It should also be noted that the NDP engines may be interconnected to each other, which may provide a complex hardware connection routing, and in some cases may add a communication burden to the system if the application needs to frequently exchange data or messages between different NDPEs. In one embodiment, NDPEs may be able to communicate with each other via a switch, such as, but not limited to, a PCIe switch, bypassing host memory.

Figures 4A, 4B:
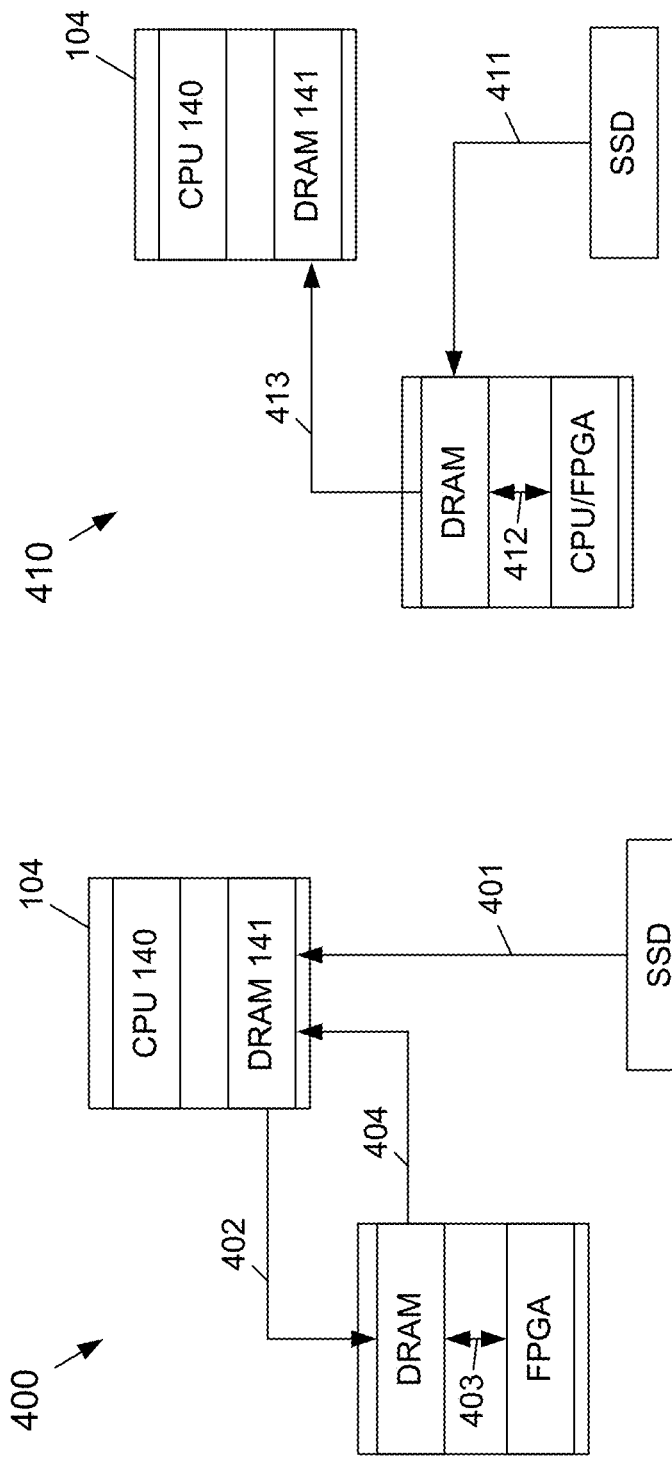
FIG. 4A depicts a typical example data flow in which raw data passes through host-side DRAM to an NDPE.
FIG. 4B depicts an alternative example data flow in which raw data does not need to pass through host-side DRAM to an NDPE according to the subject matter disclosed herein.

FIG. 4A depicts a typical example data flow 400 in which raw data passes through host-side DRAM to an NDPE. If there is a need to accelerate a kernel (i.e., part of an application) within, for example, an FPGA-based engine, a CPU 140 of a server system 100 may first read data from an SSD to the host-side DRAM 141, as depicted at 401 in FIG. 4A. The CPU 140 may then write the data to the FPGA-side DRAM at 402, and launch the kernel to process the data in FPGA at 403. The resulting data may be read to the host-side DRAM at 404.

FIG. 4B depicts an alternative example data flow 410 in which raw data does not need to pass through host-side DRAM to an NDPE according to the subject matter disclosed herein. Raw data may be read directly from an SSD to CPU/FPGA-side DRAM at 411 using a DMA (Direct Memory Access) type process. The kernel may be launched at 412 to process the data in the CPU/FPGA. The resulting data may be read to the host-side DRAM at 413. Thus, using the data flow depicted in FIG. 4B, the NDPEs in front of each SSD may work in a fully parallel manner.

Figure 5A:
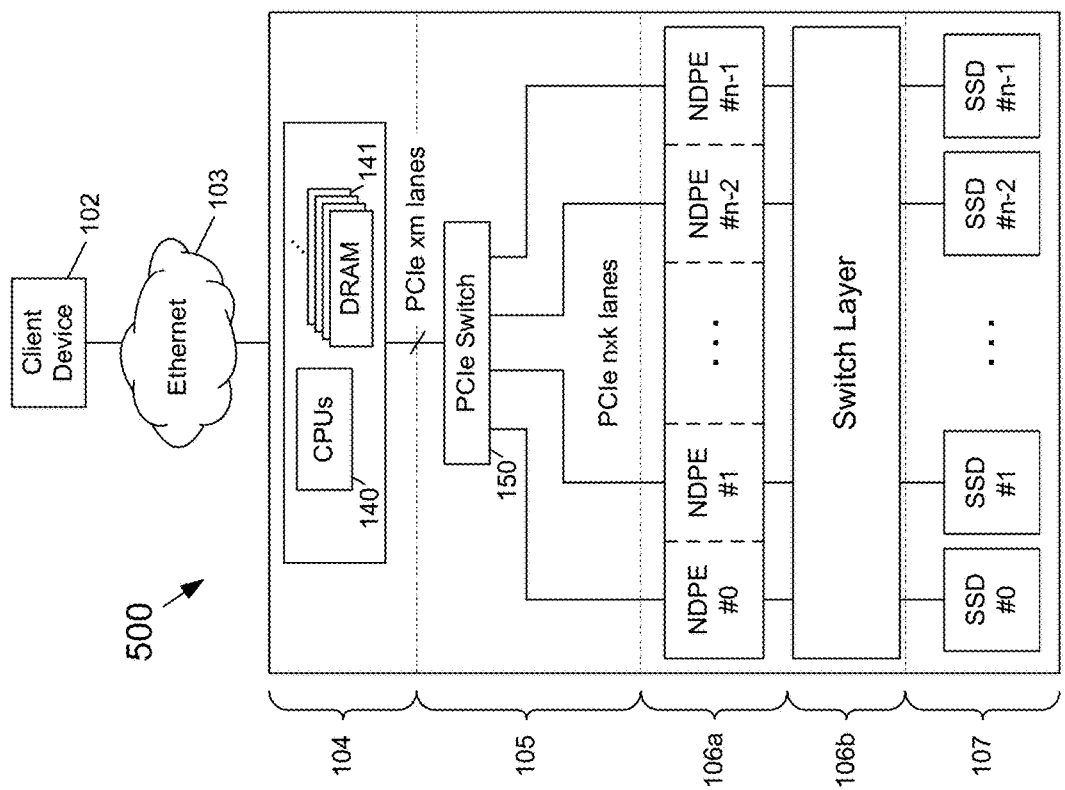
FIG. 5A depicts a block diagram of an example embodiment of an architecture of a server system according to the subject matter disclosed herein.

A server system may be configured to include a switch layer within the NDPE layer to provide flexibility in the design of the server system. FIG. 5A depicts a block diagram of an example embodiment of an architecture of an example embodiment of a server system 500 according to the subject matter disclosed herein. The server system 500 may include the same components the server system 100 depicted in FIG. 1A. The server system 500 differs from the servers system 100 by including an NDPE layer 106a and a switch layer 106b. The NDPE layer 106a and the switch layer 106b may be adaptively configured to reduce system imbalances that may occur in the server system by adaptively changing the number of NDPEs and connections between the NDPEs and the SSDs. At one extreme, the switch layer 106b may be configured so that two SSDs may be adaptively connected with two NDPEs. At another extreme, the switch layer 106b may be configured so that each SSD may be adaptively connected to all NDPEs.

Figure 5B:
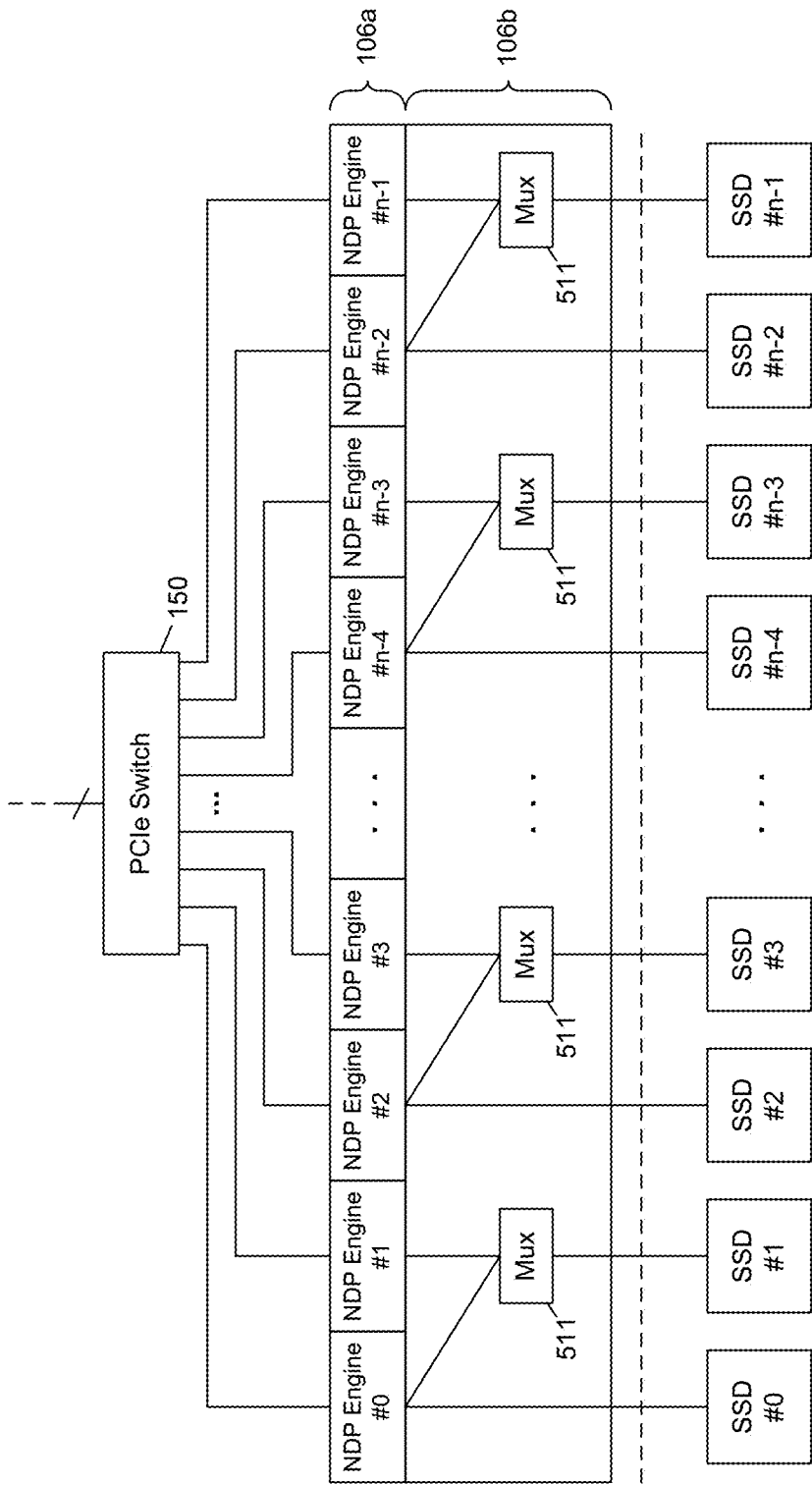
FIG. 5B depicts a block diagram of an example embodiment of switch layer in which two SSDs may be adaptively connected to two NDPEs using multiplexers according to the subject matter disclosed herein.
Figure 5C:
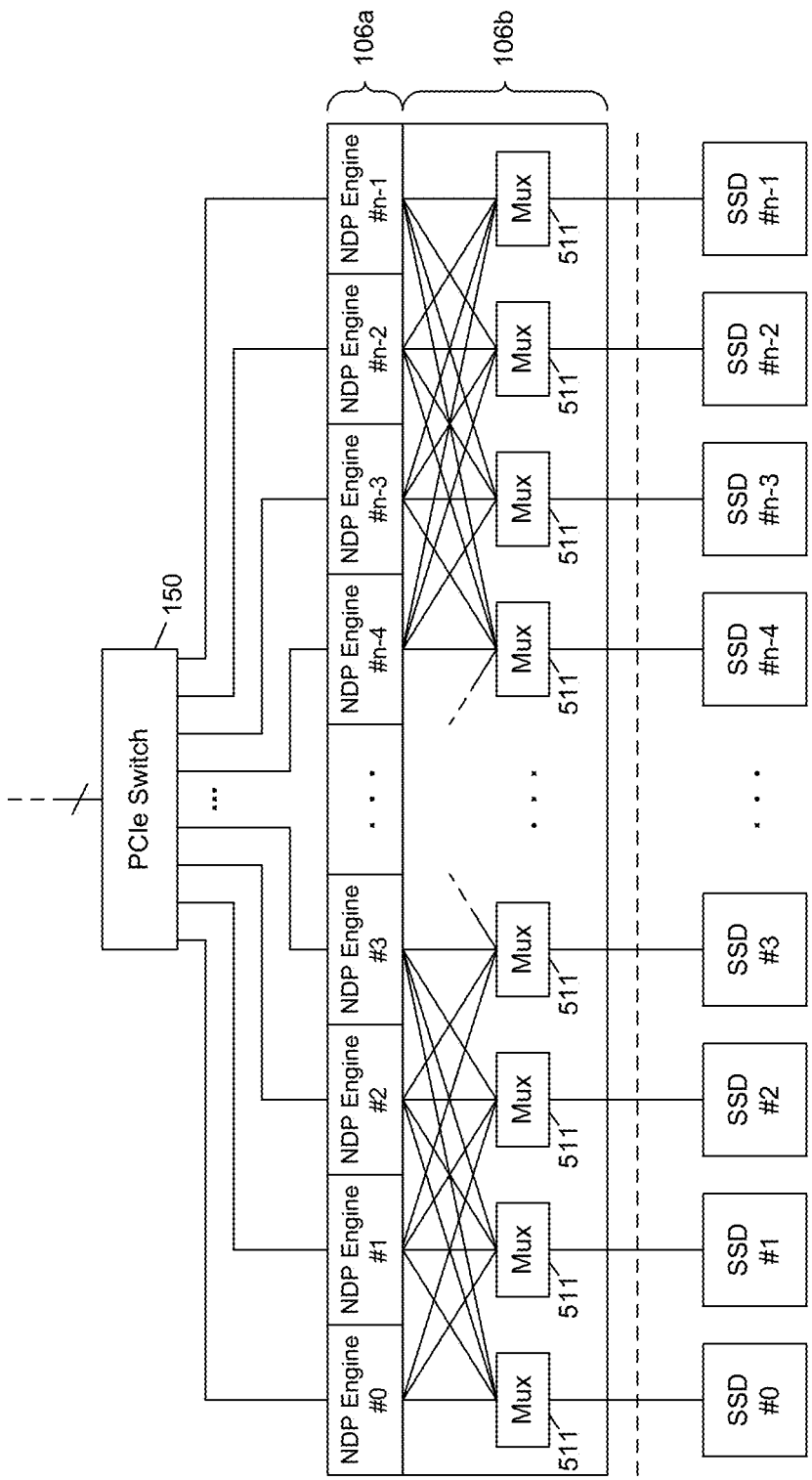
FIG. 5C depicts a block diagram of an example embodiment of switch layer in which four SSDs may be adaptively connected to four NDPEs according to the subject matter disclosed herein.
Figure 5D:
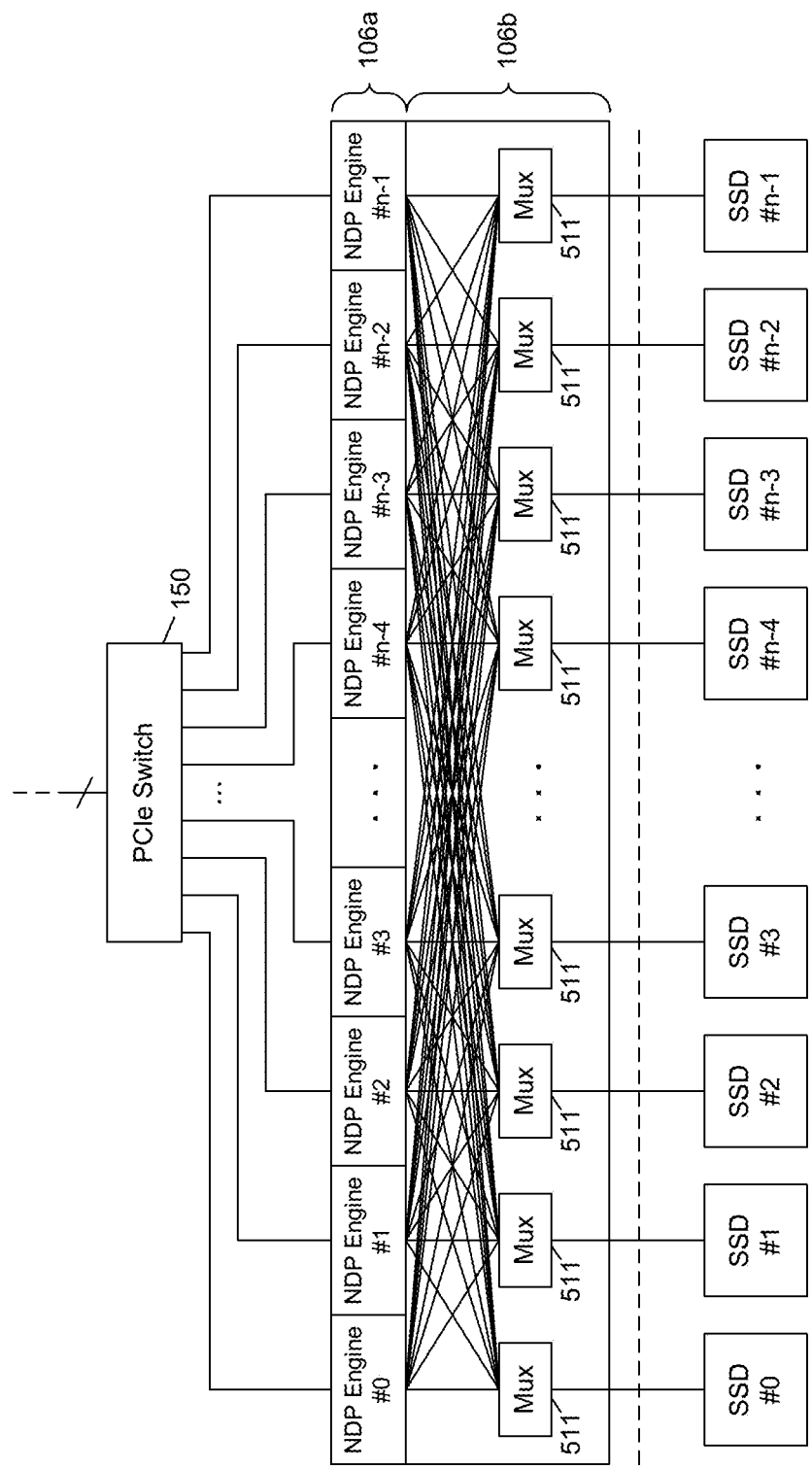
FIG. 5D depicts a block diagram of an example embodiment of a switch layer in which n SSDs may be adaptively connected to n NDPEs using multiplexers according to the subject matter disclosed herein.

FIG. 5B depicts a block diagram of an example embodiment of switch layer 106b in which each pair of SSDs may be adaptively connected to either of two NDPEs using multiplexers 511. FIG. 5C depicts a block diagram of an example embodiment of switch layer 106b in which each group of four SSDs may be adaptively connected to any of four NDPEs. The multiplexers 511 provide adaptive connections between four SSDs and four NDPEs. FIG. 5D depicts a block diagram of an example embodiment of a switch layer 106b in which n SSDs may be adaptively connected to n NDPEs using multiplexers 511.

If the server system 100 is experiencing, for example, a bandwidth-based bottleneck at the CPU 140, the multiplexers 511 depicted in FIG. 5B may be selectively activated to alleviate that bottleneck using the following technique. The SSDs that have an even ID number i will connect to an NDPE having the same ID i, and the SSDs that have an odd ID number j connect to an NDPE having an ID j−1 or j.

Referring to FIGS. 5A and 5B, the number n' of NDP engines that may be theoretically activated may be determined as follows:

$$n'=\min\{PBW, NBW, CPUBW, NDPBW*n\}/NDPBW, \quad (1)$$

in which PBW is the bandwidth of the fabric interconnection between the CPU and the NDP engines, NBW is the bandwidth of the network 103, CPUBW is the bandwidth of the CPU 140, n is the integer number of available NDPEs, and NDPBW is the bandwidth of an NDP engine (in which all NDPEs have the same bandwidth).

The actual number N of NDPEs that should be activated is given by $$N=\max\{n', n/2\}. \quad (2)$$

Table 1 below sets forth an example number of NDPEs that should be activated for a server system having eight NDPEs (i.e., n=8).

TABLE 1

| N | ID of activated NDPE |
|---|---|
| 4 | 0 2 4 6 |
| 5 | 0 1 2 4 6 |
| 6 | 0 1 2 3 4 6 |
| 7 | 0 1 2 3 4 5 6 |
| 8 | 0 1 2 3 4 5 6 7 |

Figure 6A:
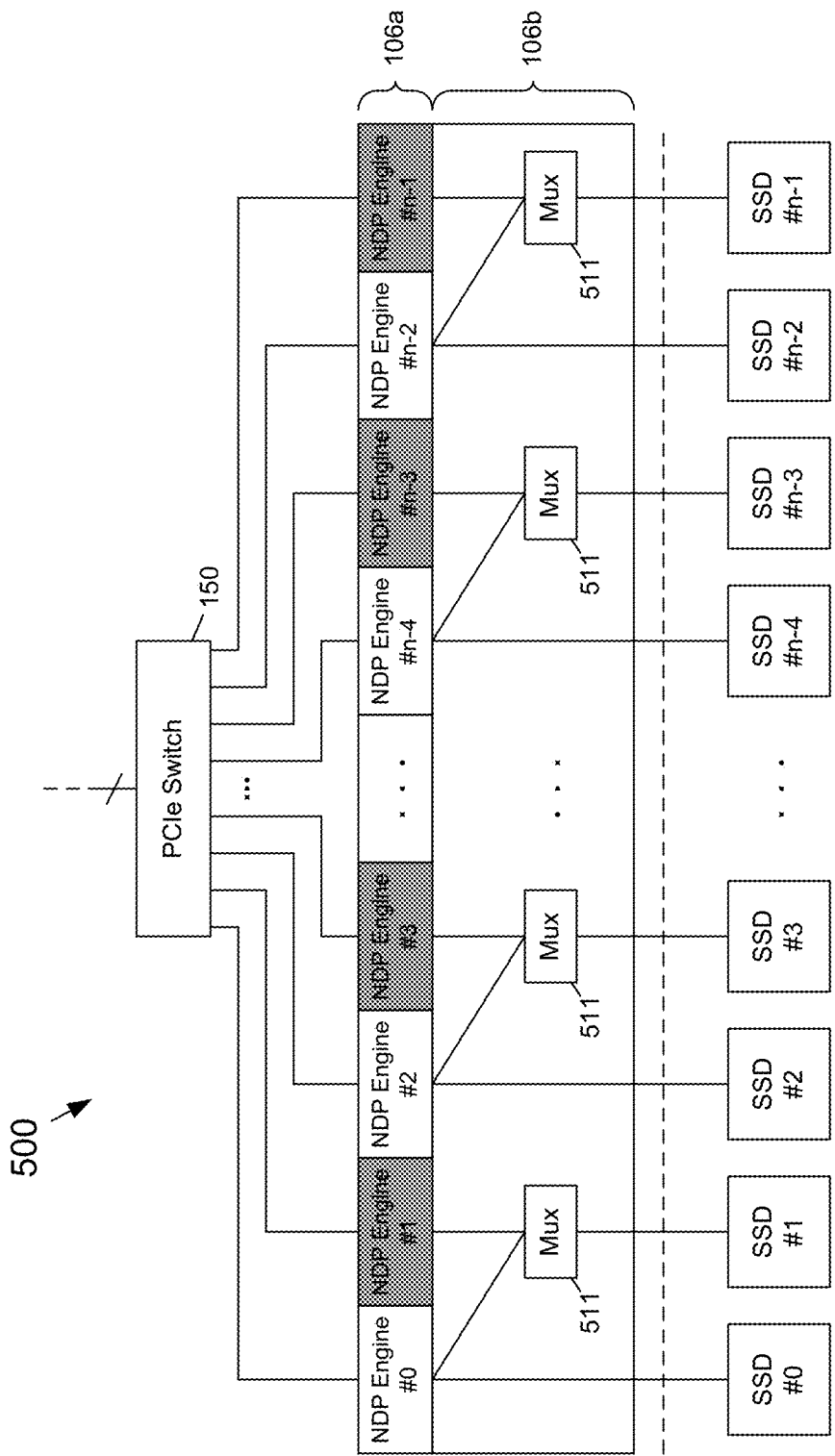
FIG. 6A depicts selectively activated NDPEs in an example server system in which N=4 according to the subject matter disclosed herein.
Figure 6B:
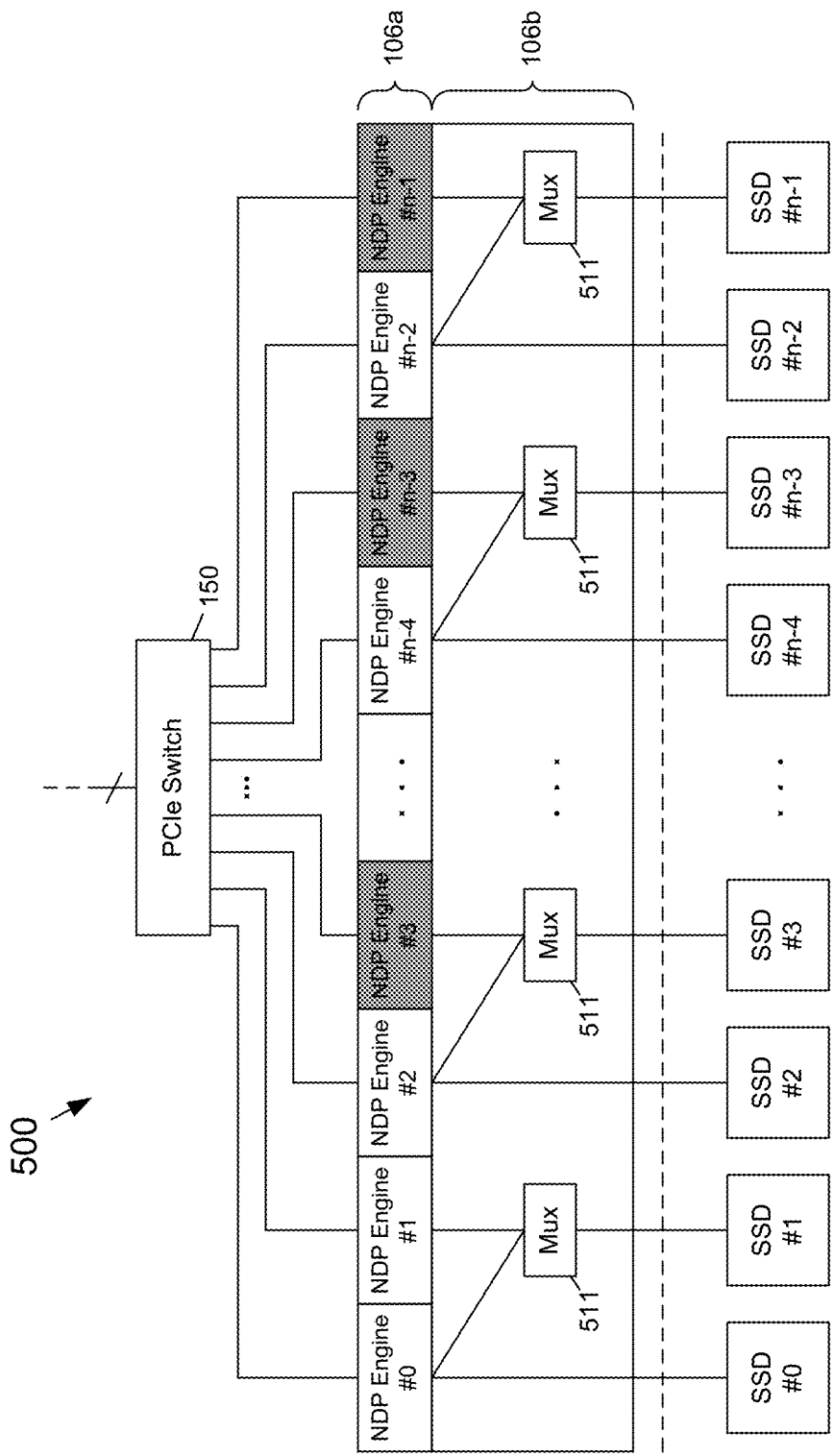
FIG. 6B depicts selectively activated NDPEs in an example server system in which N=5 according to the subject matter disclosed herein.
Figure 6C:
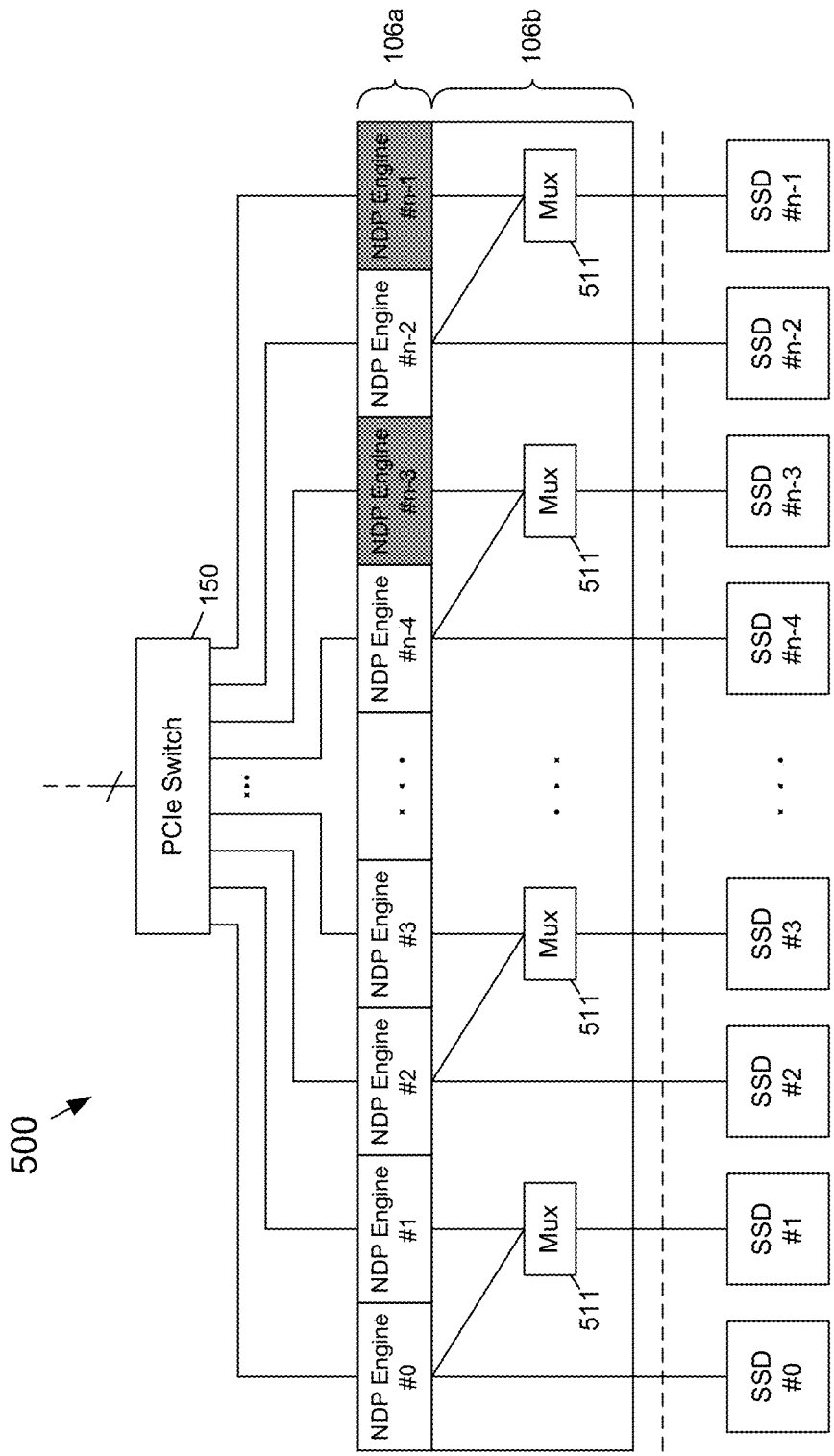
FIG. 6C depicts selectively activated NDPEs in an example server system in which N=6 according to the subject matter disclosed herein.
Figure 6D:
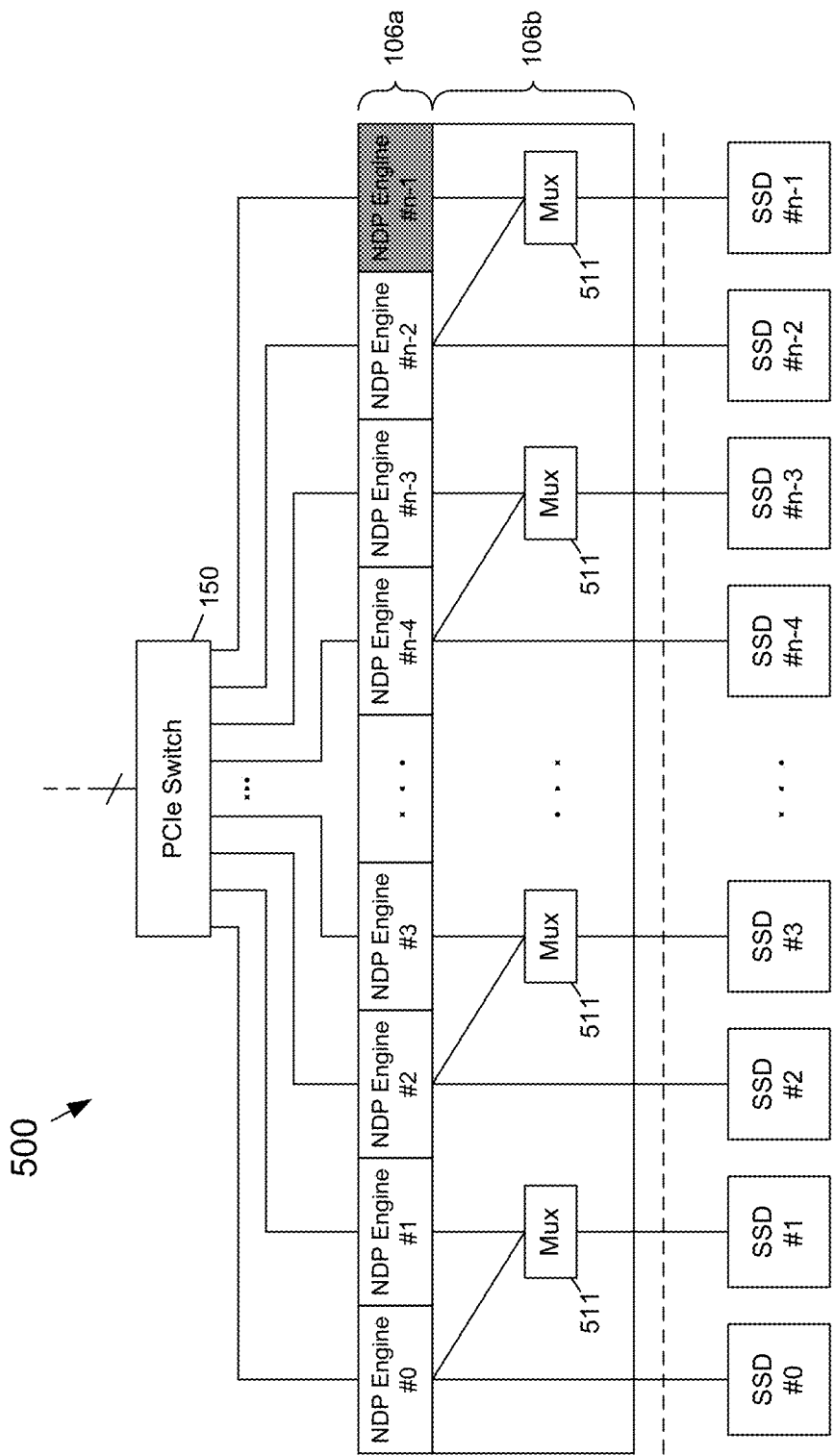
FIG. 6D depicts selectively activated NDPEs in an example server system in which N=7 according to the subject matter disclosed herein.
Figure 6E:
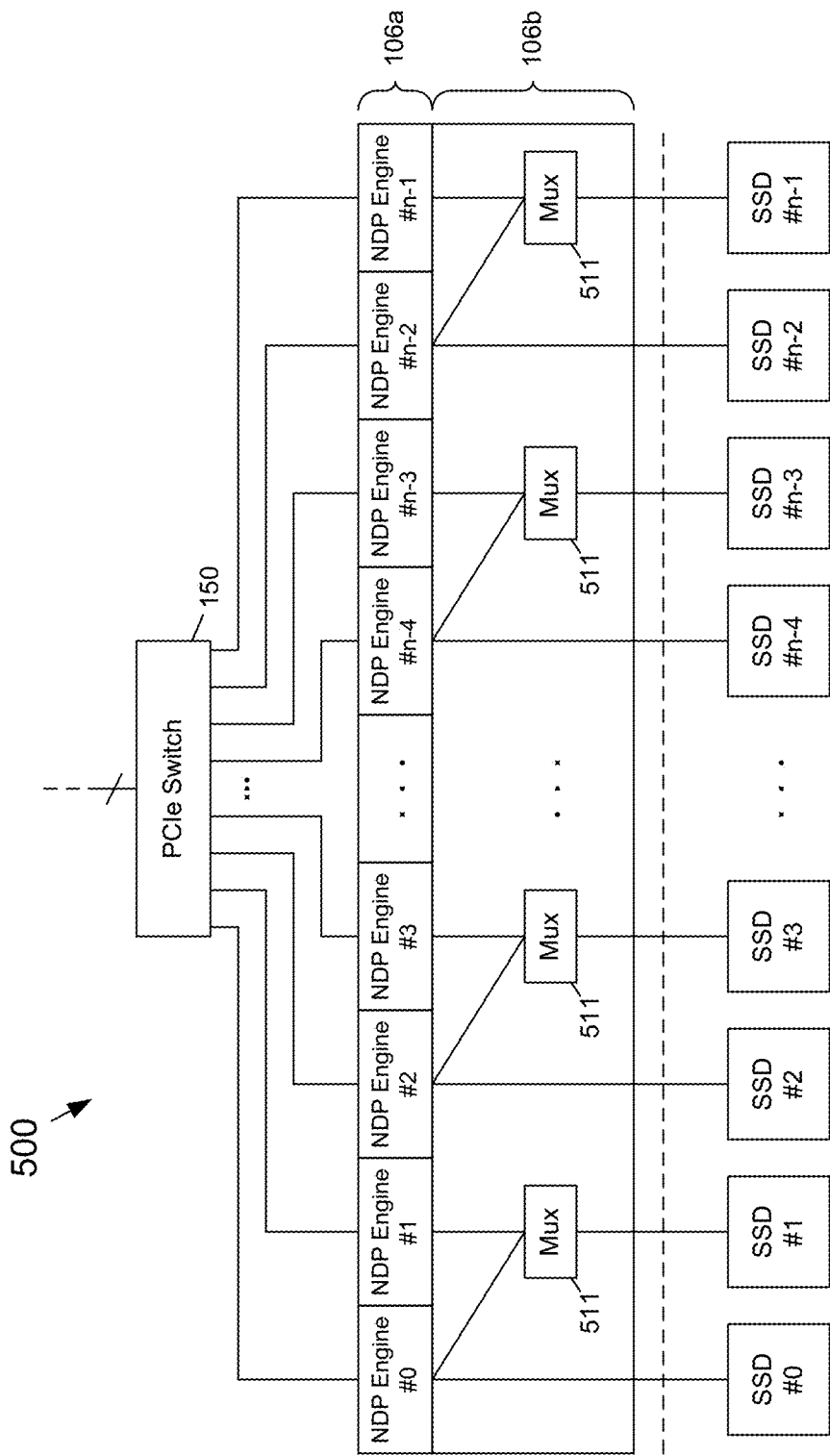
FIG. 6E depicts selectively activated NDPEs in an example server system in which N=8 according to the subject matter disclosed herein.

NDPEs depicted in FIGS. 6A-6E that have a gray color are selectively not activated. FIG. 6A depicts selectively activated NDPEs in the example server system 500 in which N=4. FIG. 6B depicts selectively activated NDPEs in the example server system 500 in which N=5. FIG. 6C depicts selectively activated NDPEs in the example server system 500 in which N=6. FIG. 6D depicts selectively activated NDPEs in the example server system 500 in which N=7. FIG. 6E depicts selectively activated NDPEs in the example server system 500 in which N=8.

The following example pseudo code may be used for determining which NDPE will be selectively activated and which SSD should be switched to an activated NDPE.

```
for (i=0; i<n; i++){          //Initialize all NDPEs with 0 (power off)
    NDP[i] = 0
}
for(i=0; i<(n/2); i++){       //Initialize all NDPE with even ID number
                               with 1 (active)
    NDP[i*2] = 1;
k=N-n/2
for (i=0; i<k; i++){          //Activate the NDP engines that are needed
    NDP[i*2+1] = 1;
}
Decide which NDPE an SSD should be switched to:
for (i=0; i<n; i++){
    if (NDP[i]==0             //This NDPE is powered off
        SSD[i] = 1            //Switch this SSD to the NDPE #i-1
    else
        SSD[i] = 0            //This SSD uses the NDPE # i
}
```

Figure 7:
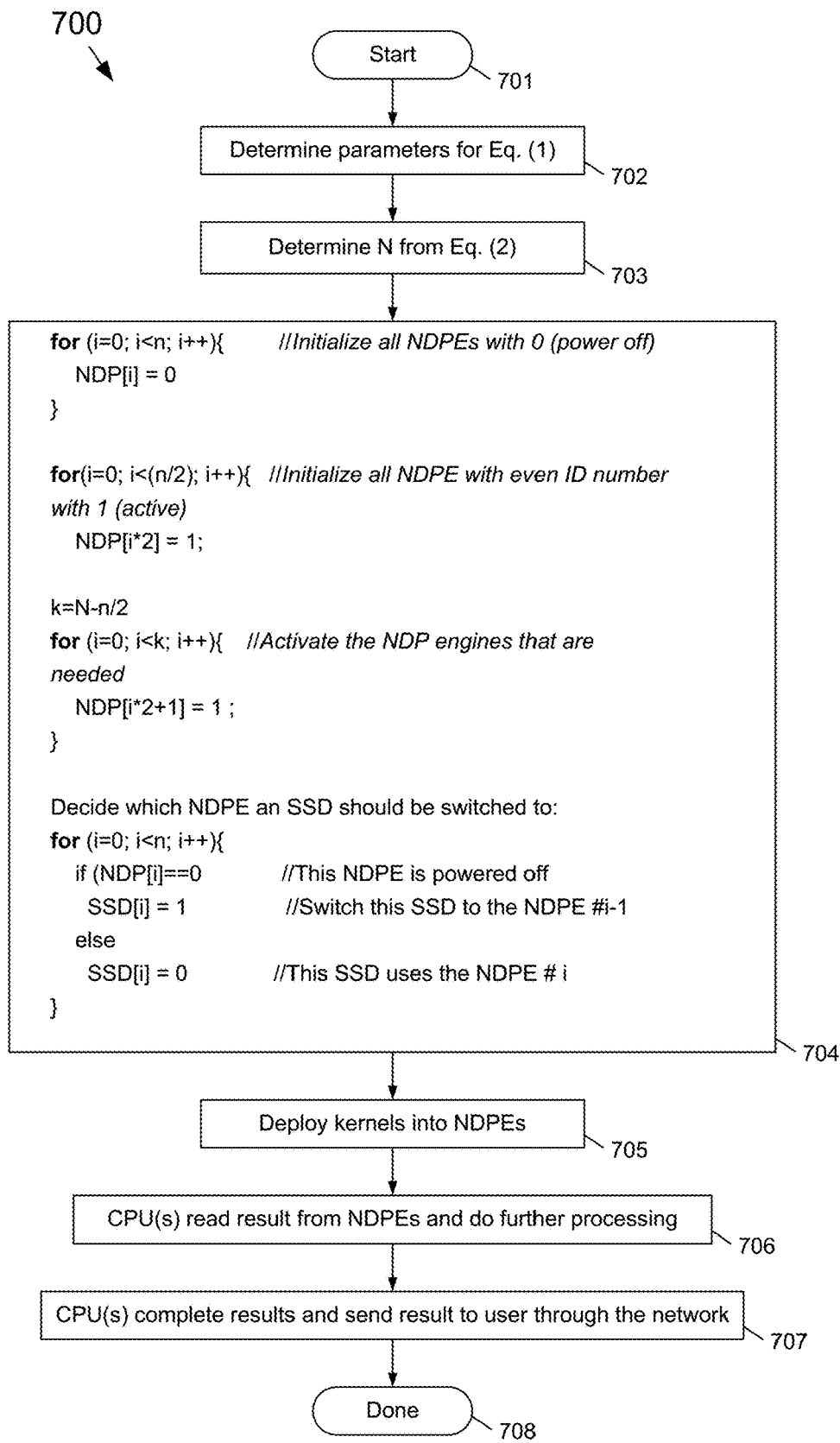
FIG. 7 depicts a flow diagram for an example method using example pseudo code for determining which NDPEs are selectively activated and which SSDs are switched to activated NDPEs for an example server system having eight NDPEs according to the subject matter disclosed herein.

FIG. 7 depicts a flow diagram for an example method 700 using the example pseudo code above for determining which NDPEs are selectively activated and which SSDs are switched to activated NDPEs for an example server system having eight NDPEs (i.e., n=8) according to the subject matter disclosed herein. Consider that a bottleneck is being experienced by the CPU of the example server system 500. The process begins at 701. At 702, the parameters of Eq. (1) are determined. The number n' of NDP engines that may be theoretically activated may then be determined from Eq. (1). At 703, the number N from Eq. (2) is determined. At 704, the example pseudo code set forth above may be executed. At 705, kernels may be deployed in the NDPEs that are to be activated. At 706, the CPU(s) of the server system 500 may read the result and may perform any further processing. At 707, the CPU(s) of the server system 500 completes the result and sends the results to a user through the network with system imbalances having been reduced. The process ends at 708.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A server system, comprising:
    a first device;
    at least one central processing unit (CPU);
    a first near data processing (NDP) engine comprising a first computing unit, the first NDP engine being associated with the first device and connected to the CPU and the first device; and
    a second NDP engine comprising a second computing unit connected to the CPU and a second device;
    wherein the first NDP engine is configured to perform a computation on data associated with the second device; and
    wherein the server system is configured to selectively activate the second NDP engine.

2. The server system of claim 1, wherein the device server system is configured to selectively activate the second NDP engine based on a bandwidth.

3. The server system of claim 2, wherein the bandwidth comprises at least one of a bandwidth associated with the CPU, a bandwidth associated with the first NDP engine, or a bandwidth associated with the second NDP engine.

4. The server system of claim 1, wherein:
    the server system further comprises a network interface that communicatively couples the server system to at least one system using a network, and a communication fabric connected to the CPU and the first and second NDP engines; and
    a number including at least one of NDP engines comprising the server system is based, at least in part, on a bandwidth of a bandwidth associated with the CPU, a bandwidth associated with the network, a bandwidth associated with the communication fabric and a bandwidth associated with the first and second NDP engines divided by a bandwidth associated with an NDP engine.

5. The server system of claim 1, further comprising a switch layer configured to connect the first NDP engine with the second device.

6. The server system of claim 5, wherein the switch layer is configured to connect the second NDP engine with the second device.

7. The server system of claim 6, wherein the switch layer comprises a network fabric.

8. The server system of claim 7, wherein the network fabric comprises a Peripheral Component Interconnect Express (PCIe) network, and
wherein at least one NDP engine comprises a processor-based NDP engine or a Field Programmable Gate Array (FPGA) based NDP engine.

9. A server system, comprising:
a network interface that communicatively couples the server system to at least one system using a network;
a first device;
at least one central processing unit (CPU) coupled to the network interface and the first device;
a first near data processing (NDP) engine comprising a first computing unit, the first NDP engine being associated with the first device and connected to the CPU and the first device associated with the first NDP engine; and
a second NDP engine comprising a second computing unit connected to the CPU and a second device;
wherein the first NDP engine is configured to perform a computation on data associated with the second device; and
wherein the server system is configured to selectively activate the second NDP engine.

10. The server system of claim 9, wherein the server system is configured to selectively activate the second NDP engine based on a workload.

11. The server system of claim 9, wherein:
the server system further comprises a communication fabric connected to the CPU and the first and second NDP engines; and
a number including at least one of NDP engines comprising the server system is based on a bandwidth of a bandwidth associated with the CPU, a bandwidth associated with the network, a bandwidth associated with the communication fabric and a bandwidth associated with the first and second NDP engines divided by a bandwidth associated with an NDP engine.

12. The server system of claim 9, further comprising a switch layer configured to connect the first NDP engine with the second device.

13. The server system of claim 12, wherein the switch layer comprises a network fabric.

14. The server system of claim 13, wherein the network fabric comprises a Peripheral Component Interconnect Express (PCIe) network, and
wherein at least one NDP engine comprises a processor-based NDP engine or a Field Programmable Gate Array (FPGA) based NDP engine.

15. A server system, comprising:
a first device;
at least one central processing unit (CPU) coupled to the first device;
a first near data processing (NDP) engine comprising a first computing unit, the first NDP engine being associated with the first device and connected to the CPU and the first device associated with the first NDP engine; and
a second NDP engine comprising a second computing unit connected to the CPU and a second device;
wherein the first NDP engine is configured to perform a computation on data associated with the second device; and
wherein the server system is configured to selectively activate the second NDP engine.

16. The server system of claim 15, wherein the server system is configured to selectively activate the second NDP engine based on a bandwidth.

17. The server system of claim 16, wherein the bandwidth comprises at least one of a bandwidth associated with the CPU, a bandwidth associated with the first NDP engine, or a bandwidth associated with the second NDP engine.

18. The server system of claim 15, wherein:
the server system further comprises:
a network interface that communicatively couples the server system to at least one system using a network, and a communication fabric connected to the CPU and the first and second NDP engines; and
a switch layer configured to connect the first NDP engine with the second device and connect the second NDP engine with the second device; and
a number including at least one of NDP engines comprising the server system is based on a bandwidth of a bandwidth associated with the CPU, a bandwidth associated with the network, a bandwidth associated with the communication fabric and a bandwidth associated with the first and second NDP engines divided by a bandwidth associated with an NDP engine.

19. The server system of claim 18, wherein the switch layer is part of a network fabric.

20. The server system of claim 19, wherein the network fabric comprises a Peripheral Component Interconnect Express (PCIe) network, and
wherein at least one NDP engine comprises a processor-based NDP engine or a Field Programmable Gate Array (FPGA) based NDP engine.

* * * * *